April 14, 1931. L. R. NELSON 1,800,844
METHOD OF ATTACHING SWIVEL NUTS TO SPRINKLER BODIES
Filed Jan. 28, 1928
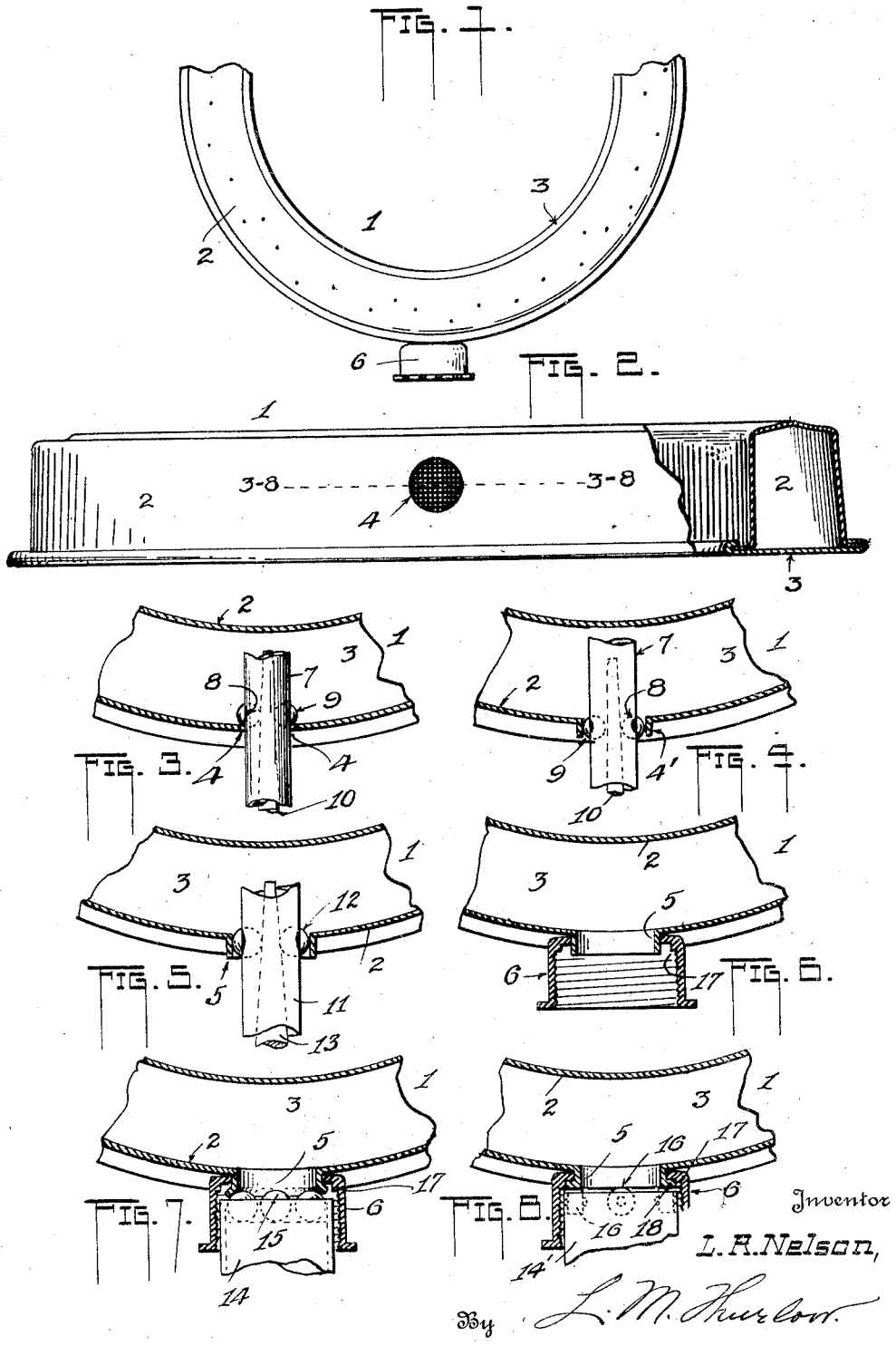

Patented Apr. 14, 1931

1,800,844

UNITED STATES PATENT OFFICE

LEWEN R. NELSON, OF PEORIA, ILLINOIS

METHOD OF ATTACHING SWIVEL NUTS TO SPRINKLER BODIES

Application filed January 28, 1928. Serial No. 250,279.

This invention pertains to lawn sprinklers. More particularly said invention relates to a sheet metal sprinkler-body and a novel manner of attaching thereto a hose-receiving nut. Further, the invention lies in the method of treatment of the metal of the sprinkler-body by which to form a part to receive and hold said nut.

The main object of the invention is to draw from the wall of a sheet metal sprinkler-body a tubular extension upon which to place a hose-receiving nut.

Another object is to provide a new and novel method of attaching a nut to a sprinkler-body by drawing a portion of the metal of said body outwardly forming a tubular part, followed by placing a nut thereon and finally flanging the extremity of the said tubular part over upon the nut to hold the same in position.

Still another object is to form a tubular extension on a sprinkler body integral therewith for the reception of the usual swivel-nut, said extension since a part of the body providing against leakage at said body.

Again, an object is to provide in a sheet metal sprinkler a method and structure by which the hose-receiving nut may swivel with respect to said sprinkler.

In addition to the above objects, certain advantages of my structure will be brought out herein aided by the appended drawing wherein:

Figure 1 is a plan of a portion of a sprinkler of ring form as one type to which the invention is applicable.

Figure 2 is a side elevation of the same produced on a much larger scale, parts being broken away to better show its form, and Figures 3 to 8 inclusive are all sections of part of the sprinkler-body on line 3—8, Figure 2, said figures showing the several operations performed upon the sprinkler-body for producing a tubular extension.

It has been the custom, heretofore, in forming a sheet metal sprinkler-body to create an opening in the wall thereof to receive the shank of the hose-receiving nut, said shank being flanged to abut upon the outer surface of the wall, the terminal of the shank being expanded and spread upon the inner wall surface clamping the wall and fixing the nut rigidly with respect to the wall. This requires a wall, in a ring type of sprinkler so high, in order to accommodate the diameter of the standard size of nut, as to make the cost of material considerably more than should otherwise be required. Again, such a method of attaching the nut leads to a fruitful source of leaks at the point of connection of the nut with the wall. In some types, also, in order to save material the ring is sometimes made low in height but with an enlargement sufficient to accommodate the nut but many operations are required to complete the work including the acts of annealing the metal after each operation and thus the cost of production is very high. Coupled with this is the fact that since the nut is fixed to the wall of the sprinkler said sprinkler in use on a lawn is easily tipped from its proper sprinkling position whenever in handling the hose with which it is connected is given a torsional twist during handling, the tipping resulting from the fact that the fitting on the hose in order to prevent leakage is screwed tightly into the fixed nut.

I have found that by certain simple operations upon the completed body of the sprinkler a tubular extension may be drawn out therefrom upon which the nut may be mounted while permitted to freely swivel. And since the diameter of such extension may be much less than the shank of the nut heretofore used, as above, the wall of the body may be kept low and thus the sprinkler can be constructed at a much lower cost than heretofore.

In the drawing the numeral 1 designates the sprinkler-body in general, which is made of sheet metal, the characters 2 and 3 indicating the top and bottom portions respectively. In the outer wall of the top 2 is created an opening 4 the marginal edge of which is drawn outwardly to form a tubular extension 5, Figures 5, 6, 7 and 8, which receives the nut 6 also shown in those figures.

The method by which the extension is formed is shown in Figures 3 to 8 inclusive and is as follows: A suitable tool is provided such as a tube 7, see Figure 3, which has one or more holes 8 in its wall in each of which is seated a ball 9 which projects a short distance outside said wall. A tapered pin 10 within the tube may hold the balls in place at the holes and is adapted to force them in an outward direction when forced between them. The said tube 7 is but slightly less in diameter than the hole 4 so that it may readily be inserted therein. When inserted into the body 1 so that the balls lie behind the inner surface of the wall of the latter the pin 10 is shifted to spread the balls to take up the position substantially as shown in Figure 3, whereupon by a withdrawal of the tube 7 while imparting rotation thereto the metal around the hole 4 is crowded outwardly enlarging said hole and forming the short tubular extension 4′, Figure 4.

A tube 11 similar to but larger in diameter than the tube 7, and having balls 12 and pin 13, is next inserted into the body in the same way as before and upon its withdrawal during rotation the metal of the wall of the sprinkler is increased in its expanded form lengthening the tubular extension and producing the finished extension 5 of said Figures 5, 6, 7 and 8.

The nut 6, Figure 6, is now placed over the extension 5 followed by the introduction of a suitable tool into the nut, Figure 7, to flare the free end of the extension 5. Said tool may comprise a body 14 having a series of balls 15 projecting from its end face. This when rotated and at the same time forced against the said extension spreads or flares the same as shown, whereupon as shown in Figure 8 a somewhat similar tool 14′ may be employed but carrying rollers 16 whose faces, under pressure on the tool, roll the flared end down flush with the inner flange 17 of the nut forming a flange 18 completing the work. It is to be understood that the inner diameter of the nut where it takes over the extension 5 is slightly greater than the latter and that the resultant flange 18 is not carried down upon the flange of the nut to the extent that the nut is prevented from freely turning. While the type of device or devices described herein for operating upon the metal serve their purpose well, other forms that will answer may be created perhaps.

Due to the fact that, as already intimated, the ability to form a tubular member from the metal of the sprinkler-body is important as providing a better structure coupled with keeping the height of the sprinkler down and reducing cost far below that heretofore possible, the sheet metal being ductile may be readily worked in the manner described, as I have discovered, and a very staunch and nonleaking arrangement wholly satisfactory in use is the result, coupled with the very important advantage of providing for a freely turning nut, annealing operation not being required at any time.

The method of operations is applicable, of course, to any type of sprinkler or to any other article constructed of or consisting partially of ductile sheet metal.

Another point of advantage in my method is that the flanges of the base 3 may be closed down into clamping position throughout the entire circumstances of the sprinkler by means of a die (not shown) without interference from any part projecting from the outer side wall. This is stated to distinguish from the older method before described where the shank of the nut must be attached to the wall before the top and bottom can be attached to one another. Since, then, there is the projecting nut in the way of a die that part of the flange of the bottom must be closed by hand work followed by soldering which has not been found to be dependable. It is to be seen that to complete the assembly of the parts followed by providing for the attachment of the nut is a procedure much to be desired.

Again, since the inner wall surface of the top 2 is smooth at the opening 4 there is no place for lodgment of dirt that may enter the body as in older type, such matter being readily washed out through the tube 5.

My particular method of performing the operation described requires no special machine or mounting for the parts operated upon and due to the type of tool used any diameter of tubular extension may be produced, and due also to the fact that the extension is created by the use of a plurality of tool-sizes the metal can be drawn without breaking or creating flaws therein, and at the same time the extension remains the same diameter throughout without requiring a special backing against which to work or force the metal.

I claim:

1. The method of forming a tubular extension on a sheet metal part which consists in introducing through a perforation in said part a tool having an extension capable of being projected laterally to a greater or less degree away from the axis of the tool's rotation, projecting said extension to engage it with the margin of the metal at a said perforation, shifting the tool axially and withdrawing it while the extension is in engagement with the metal forming a tubular extension.

2. The method of forming a tubular extension on a sheet metal part which consists in introducing through a perforation in said part a tool having an extension capable of being projected laterally to a greater or less degree from the axis of the tool's rotation, projecting said extension to engage it with the margin of the metal at said perforation, rotating the tool, shifting the tool axially and withdrawing it during rotation while the extension is in engagement with the metal.

3. The method of forming a tubular extension on a sheet metal part which consists in creating a perforation in said part, introducing through the perforation a tool having an extension capable of being projected laterally to a greater or less degree away from the axis of rotation, projecting said extension to engage the margin of the metal at said perforation, rotating the tool, and shifting the tool axially during rotation while the extension is in engagement with the metal.

4. The method of forming a tubular extension on the wall of a sprinkler-body which consists in creating a perforation in said wall, introducing through the perforation a tool having an extension capable of being projected laterally away from the axis of the tool's rotation, projecting said extension to engage one of the surfaces of the metal adjacent the perforation, rotating the tool and withdrawing it beyond the other surface of the metal while in working engagement with the same.

5. In a method of forming a tubular extension on the wall of the formed body of a sprinkler having a perforation and attaching a swivel-nut thereto, the method of introducing through the perforation a tool capable of being expanded to a greater diameter than said perforation, expanding the tool after its introduction, rotating the tool against the metal adjacent the said perforation and withdrawing it, placing a nut upon the created tubular extension, introducing a tool into the nut upon the extension, and applying pressure to and spreading the extension upon the nut.

6. A method of forming a tubular extension on a sheet metal part having a perforation which consists in introducing through the perforation from one side a tool having part thereof greater in diameter than said perforation and rotating it in engagement with the other side of the metal at such perforation, and withdrawing said tool while in rotation.

7. A method of forming a tubular extension on a sheet metal part having a perforation which consists in separately and successively introducing tools through the perforation parts of each of which can be spread apart, spreading the parts of each tool after its introduction, rotating each tool in engagement with the margin of the metal at the perforation and simultaneously withdrawing the same.

8. In a method of forming a tubular extension on a ductile sheet metal part having a perforation the method which consists in separately and successively introducing through the perforation a tool of one size and then a tool of a larger size, parts of each of which can be spread to create a measurement greater in extent than the diameter of said perforation, spreading the parts after such introduction, rotating each tool in engagement with the margin of the metal at the perforation, and while in rotation withdrawing the same through said perforation.

9. The method of connecting a nut to the wall of a sprinkler-body which consists in creating a perforation in said wall, introducing a tool through said perforation having a lateral extension to engage the margin of the metal at such perforation, rotating the tool and withdrawing it during rotation, forming a tube, placing a nut upon the tube, and applying a rotating tool to the extremity of the tube to spread the same into engagement with said nut.

10. The method of attaching a swivel nut to the wall of a sprinkler-body consisting in creating a perforation in said wall, drawing the margin of the metal at said perforation out of the plane of the wall into a tube, placing a nut upon the resultant tube, and flanging the end of the tube upon the nut.

11. In a method of forming a tubular extension on a ductile sheet metal part having a perforation, the method which consists in introducing through said perforation a tool capable of being expanded, expanding the tool to a diameter larger than said perforation after such introduction, rotating the same in engagement with the metal at said perforation, and withdrawing it during such engagement and rotation.

12. In a method of forming a tubular extension on the wall of the formed body of a sprinkler having a perforation and attaching a swivel-nut thereto, the method of introducing through the perforation a tool capable of being expanded to a greater diameter than said perforation, expanding said tool after its introduction, rotating the tool against the inner wall of the body, withdrawing the tool during rotation, placing a nut upon the created tubular extension, introducing a tool into the nut upon the extension, and applying pressure to and rotating the tool to spread the extension upon the nut.

In testimony whereof I affix my signature.

LEWEN R. NELSON.